(12) United States Patent
Heller

(10) Patent No.: US 10,047,729 B2
(45) Date of Patent: Aug. 14, 2018

(54) SOLAR COLLECTOR PLANT WITH THERMAL STORAGE

(71) Applicant: STELLENBOSCH UNIVERSITY, Stellenbosch (ZA)

(72) Inventor: Lukas Heller, Stellenbosch (ZA)

(73) Assignee: STELLENBOSCH UNIVERSITY, Stellenbosch, Western Cape Province (ZA)

( * ) Notice: Subject to any disclaimer, the term of this patent is extended or adjusted under 35 U.S.C. 154(b) by 48 days.

(21) Appl. No.: 14/777,929

(22) PCT Filed: Mar. 17, 2014

(86) PCT No.: PCT/IB2014/059899
§ 371 (c)(1),
(2) Date: Sep. 17, 2015

(87) PCT Pub. No.: WO2014/147547
PCT Pub. Date: Sep. 25, 2014

(65) Prior Publication Data
US 2016/0281688 A1    Sep. 29, 2016

(30) Foreign Application Priority Data
Mar. 20, 2013    (ZA) .................. 2013/02103

(51) Int. Cl.
*F01K 3/12*    (2006.01)
*F03G 6/06*    (2006.01)
*F22B 1/00*    (2006.01)

(52) U.S. Cl.
CPC ............... *F03G 6/064* (2013.01); *F01K 3/12* (2013.01); *F22B 1/006* (2013.01); *Y02E 10/46* (2013.01)

(58) Field of Classification Search
CPC .... F03G 6/064; F02C 1/05; F01K 3/12; F22B 1/006; Y02E 10/41; Y02E 10/44; Y02E 10/46
(Continued)

(56) References Cited

U.S. PATENT DOCUMENTS 4,286,141 A * 8/1981 MacCracken ......... F24H 7/0416
165/10
4,942,736 A * 7/1990 Bronicki ................... F02C 1/05
60/641.12
(Continued)

FOREIGN PATENT DOCUMENTS

DE    102007013430 A1    9/2008
DE    102011004263 A1    8/2012
EP    2525051 A1    11/2012

OTHER PUBLICATIONS

Buck R et al: "Dual-receiver concept for solar towers", Solar Energy, Pergamon Press. Oxford, GB, vol. 80, No. 10, Oct. 1, 2006 (Oct. 1, 2006), pp. 1249-1254, XP027986188, ISSN: 0038-092X [retrieved on Oct. 1, 2006].
PCT/IB2014/059899, International Search Report and Written Opinion, dated Aug. 27, 2014, 8 pages.

*Primary Examiner* — Phutthiwat Wongwian
*Assistant Examiner* — Loren Edwards
(74) *Attorney, Agent, or Firm* — Lathrop Gage LLP; Brian C. Trinque

(57) ABSTRACT

A concentrating solar power collector plant is provided in which a pressurized solar power receiver with an associated gas turbine and a low-pressure solar power receiver are used together with a common thermal energy storage system. Exhaust from the gas turbine is connected to the thermal energy storage system to deliver residual heat to the thermal energy storage system in addition to that received from the low-pressure solar power receiver. The pressurized solar power receiver may be a separate unit from the low-pressure
(Continued)

receiver and at least some heliostats are controlled to redirect reflected solar energy from one solar power receiver to the other. The pressurized solar power receiver may alternatively be combined with the low-pressure receiver in a single unit having a heat receiving part of a high-pressure receiver and a flow passage for heating air between an inlet and an outlet to form the low pressure receiver.

11 Claims, 3 Drawing Sheets

(58) Field of Classification Search
USPC ..... 60/641.1, 641.8, 641.11, 641.12, 641.13, 60/641.14, 641.15
See application file for complete search history.

(56) References Cited

U.S. PATENT DOCUMENTS

| | | | |
|---|---|---|---|
| 7,821,151 B2* | 10/2010 | Le | F03D 9/007 290/43 |
| 8,312,703 B2 | 11/2012 | Aoyama et al. | |
| 8,739,512 B2* | 6/2014 | Mills | F01K 3/00 60/203.1 |
| 2009/0217921 A1* | 9/2009 | Gilon | F03G 6/06 126/600 |
| 2011/0185742 A1 | 8/2011 | Heide et al. | |
| 2013/0207402 A1 | 8/2013 | Bronicki et al. | |

* cited by examiner

SOLAR COLLECTOR PLANT WITH THERMAL STORAGE

CROSS-REFERENCE TO RELATED APPLICATIONS

This application is the U.S. national phase of International Application No. PCT/IB2014/059899, filed Mar. 17, 2014, which designed the U.S., and which claims priority to South African Application No. ZA2013/02103, filed Mar. 20, 2013. Each of the above-referenced applications is hereby incorporated by reference in their entirety.

FIELD OF THE INVENTION

This invention relates to a solar collector plant of the general type in which incoming solar radiation is focused on one or more central receivers via multiple tracking mirrors called heliostats and the thermal energy collected is used in a gas turbine with residual energy being stored in a thermal storage facility for later use. The central receivers are typically located on one or more towers that are positioned generally at the center of a heliostat field, at least in the sense of a central receiver servicing multiple heliostats.

BACKGROUND TO THE INVENTION

Solar power receivers have been made in a number of different configurations. Pressurized (high pressure) and open (low pressure) solar power receivers have both been tested successfully in research facilities and pre-commercial demonstration plants have been built. Prior receivers that can generate hot pressurized air include tubular receivers and closed volumetric receivers.

Tubular receivers are termed indirectly-irradiated receivers and generally consist of multiple high temperature resistant metal alloy boiler tubes through which a pressurized working fluid is passed such as compressed air, water/steam, carbon dioxide or any other suitable working fluid.

On the other hand, closed volumetric receivers are regarded as directly-irradiated receivers. Closed volumetric receivers typically make use of a pressurized quartz window through which solar irradiation passes and strikes a porous absorber medium inside a pressurized chamber. Pressurized gas moves through the absorber medium and thus gains thermal energy while cooling down the absorber medium.

Open (low pressure) volumetric receivers are also generally directly irradiated receivers. In this instance ambient air, instead of pressurized gas, is drawn through an absorber medium that is exposed to concentrated solar radiation. A limitation of an open volumetric receiver is that it can, at the present state of technological development, only practically be used in a limited number of applications such as Rankine cycle for the production of electrical energy.

R. Buck et al. in an article entitled "Dual-receiver concept for solar towers" (Solar Energy 80 (2006) 1249-1254) describe a low pressure type of solar receiver in which evaporation is performed in directly irradiated absorber tubes, while feed water pre-heating and steam superheating is done in a heat exchanger fed with hot air from an open volumetric receiver. The entire arrangement operates on the Rankine cycle.

US Patent Publication No. US20110185742 to Heide et al proposes several combined cycle concentrating solar power plant layouts, featuring a separate heat transfer medium cycle around the receiver, a high temperature thermal energy storage system in this cycle, a heat exchanger to a Brayton cycle and a Rankine steam cycle, which has two heat sources. One of them is a solar boiler in which the high temperature medium generates steam and the other one is powered from the exhaust gases of the gas turbine.

US Patent Publication No. 2013/0207402 describes a combined cycle power plant with two different pressure levels on the gas side. It mentions air receivers at two different pressure levels and two different vertical locations. However, all of their receivers are pressurized and feed the gas turbines.

U.S. Pat. No. 8,312,703 to Aoyama et al proposes four different embodiments of a solar driven combined cycle plant. They feature pressurized air and steam superheating receivers wherein the steam is generated through the gas turbine exhaust gases. In some of the proposals, the air receiver is cooled by the superheated steam. One embodiment features an auxiliary fuel burner and one has only a pressurized air receiver. In the cases with two receivers, it is stated that in low part-load, the air-receiver is not used and the energy is concentrated on the steam receiver, which has a lower rating.

European Patent EP 2525051 to Aga et al describes a steam generating receiver and a separate receiver for charging a molten salt thermal energy storage system. During the discharge mode, energy for steam generation is provided by the molten salt by way of a heat exchanger. Focusing of heliostats on either one of the receivers located on one or several towers is mentioned.

It is known that a gas turbine operated by a high-pressure high-temperature working fluid operates most efficiently within rather limited ranges of thermal energy input by way of the pressurized working fluid. This being so, a balance needs to be considered when designing a gas turbine operated system in order to target a design efficiency. The solar heat source needs to be scaled to such a level that the gas turbine can operate for as much time as possible, while minimizing the necessity to defocus mirrors from the receiver.

SUMMARY OF THE INVENTION

In accordance with this invention is provided a concentrating solar power collector plant comprising a heliostat field for directing reflected solar radiation towards a pressurized solar power receiver having an associated gas turbine and to a low-pressure solar power receiver having an associated thermal energy storage system, the concentrating solar power collector plant being characterized in that exhaust from the gas turbine is also connected to the thermal energy storage system to deliver residual heat to the thermal energy storage system in addition to that received from the low-pressure solar power receiver.

In a first variation of the invention the pressurized solar power receiver may be a separate unit from the low-pressure solar power receiver and at least some heliostats associated with the solar power collector plant are connected to a controller that redirects reflected solar energy from one solar power receiver to the other in a manner so as to maintain a generally predetermined solar power and energy input into the pressurized solar power receiver.

Solar power in excess of that required by the pressurized solar power receiver may be directed to the low-pressure solar power receiver for thermal storage in the normal course of events or, alternatively, for immediate use in a Rankine cycle electricity generating facility. This may be achieved by at least some heliostats associated with the solar power collector plant being connected to a controller that redirects reflected solar energy from one solar power receiver to the other in a manner so as to maintain a generally predetermined solar power and energy input into the pressurized solar power receiver. This means that the heliostat field is selected such that the gas turbine can be operated at close to optimal load (that is typically synonymous with maximum load) for long durations and the controller is programmed to direct excess reflected solar energy at high irradiation intensities away from the high pressure receiver and towards the low pressure receiver at times when that reflected solar energy is not required to maintain the gas turbine at close to optimal load.

Solar power in excess of that required to maintain the gas turbine at close to optimal load is directed to the low-pressure solar power receiver for thermal storage or, alternatively, for immediate use in a Rankine cycle electricity generating facility.

In a second variation of the invention the pressurized solar power receiver is combined with the low-pressure solar power receiver in a single unit in which radiant energy is directed at a heat receiving part of a high-pressure receiver and a variable amount of low pressure air (depending on the amount of available radiant energy) is passed over that part so as to flow between an air inlet and an air outlet and thereby become heated by the heat receiving part to thereby constitute the low pressure receiver. Such an arrangement is more fully described in published international patent application WO2013160872 the content of which is incorporated herein by reference. It is to be noted that in such an arrangement the outlet from the high-pressure receiver can be fed through a further solar power receiver in order to further heat the compressed gas.

Further features of the invention provide for the gas turbine to be coupled to an electrical generator and a compressor for supplying pressurized gas to the pressurized solar power receiver; for the pressurized gas to be air; for a combustion chamber to be optionally interposed between the outlet from the pressurized solar power receiver and the inlet to the gas turbine; for the pressurized solar power receiver to be of the tubular type; for the thermal energy storage system to be a packed bed of suitable heat resistant thermal storage units, typically rock units such as granite or dolerite; for the thermal energy storage system to form part of a Rankine cycle electricity generating installation; and for residual heat in the air leaving the Rankine cycle to be recovered by recycling the air to a suitable point in the solar power collecting plant in order to preserve at least some of such residual heat by directing the air towards a suitable inlet to the low-pressure receiver.

The above and other features of the invention will be more fully understood from the following description of embodiments of two variations of the invention with reference being made to the accompanying drawings.

DETAILED DESCRIPTION WITH REFERENCE TO THE DRAWINGS

Figure 1:
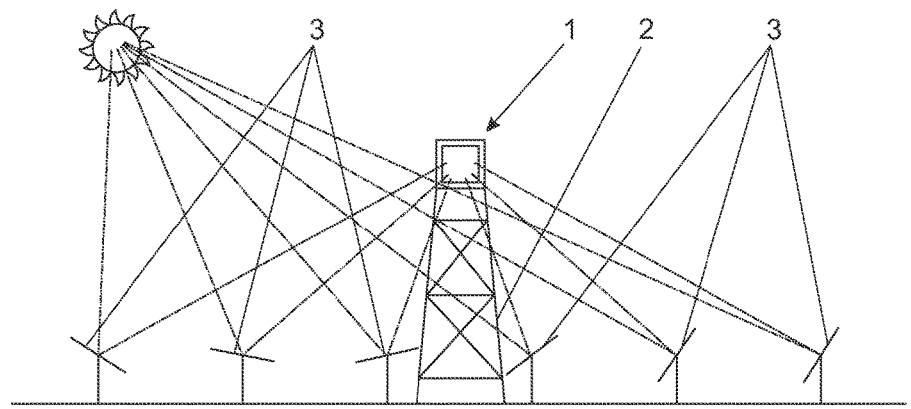
FIG. 1 is a schematic illustration of an arrangement of a heliostat field and a central tower supporting a central receiver.
Figure 2:
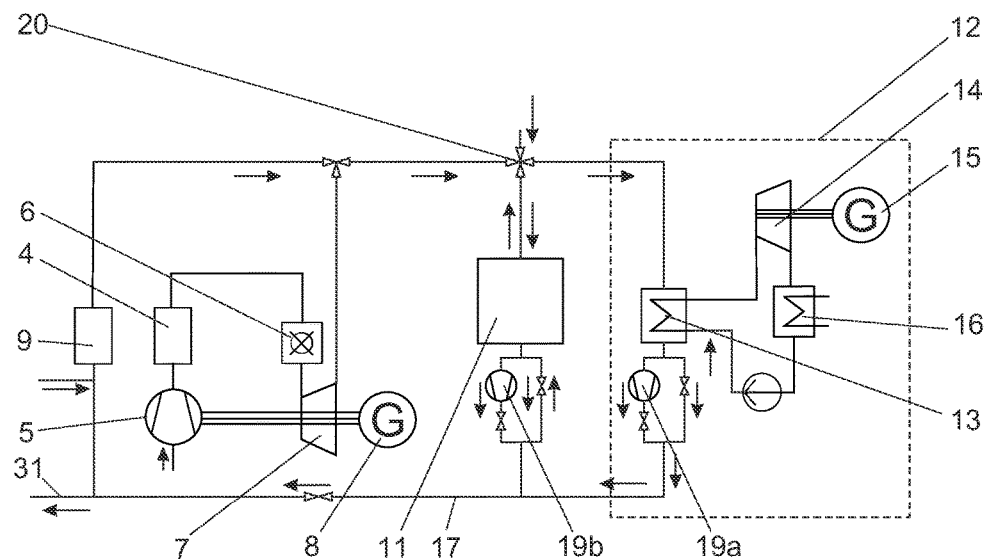
FIG. 2 is a circuit diagram of a first variation of concentrating solar power collector plant according to the invention.
Figure 3:
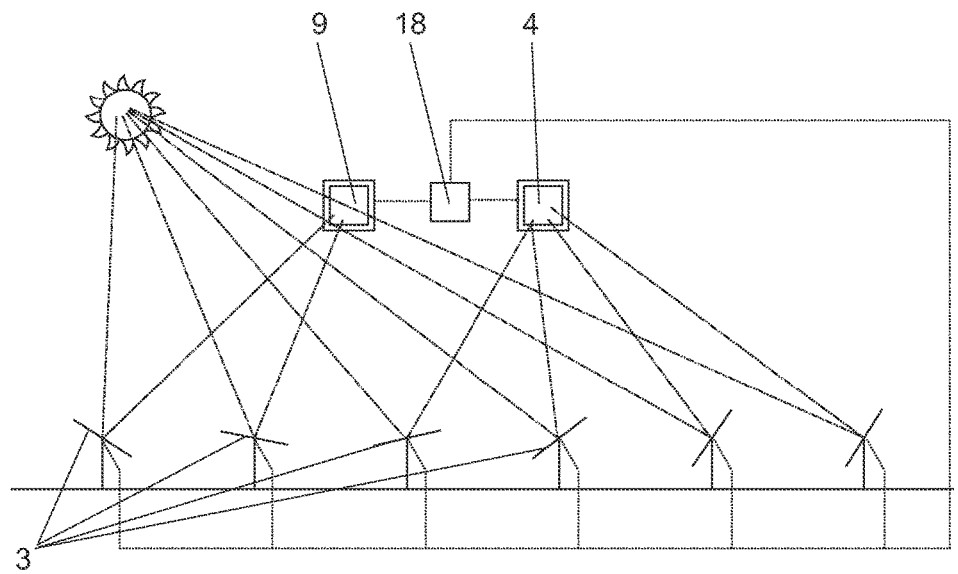
FIG. 3 is a block diagram of the control circuit.

In the embodiment of the first variation of the invention illustrated in FIGS. 1 to 3 of the drawings, a central receiver arrangement (1) for a solar power facility is mounted on the upper end of a tower (2) in a field of heliostats (3). It should be noted that whilst air is used as the working fluid in the embodiment of the invention described below, any other suitable working fluid may be used as will be quite apparent to those of ordinary skill in the art.

With more particular reference to FIGS. 2 and 3 of the drawings, the central receiver arrangement comprises a pressurized air solar power receiver (4), which is located downstream of a compressor (5) and upstream of an optional combustion chamber (6) for fuels and the expansion unit of a gas turbine (7). The gas turbine is arranged to drive the compressor and an electrical generator (8). The arrangement would operate on a Brayton cycle.

The central receiver arrangement also comprises an unpressurized (low pressure) air receiver (9) that may charge a thermal energy storage system (11) that would typically be a packed bed of a suitable rock, or other appropriate bed of suitable heat retaining units. According to demand and prevailing ambient conditions, the unpressurized air receiver (9) may also supply a Rankine cycle electricity generating facility (12) at the same time.

However, as a general rule, it is envisaged that a design will be such that the Rankine cycle electricity generating facility will mostly be used when the electricity generating facility associated with the pressurized air receiver is not functional or not fully functional. Of course, it will be understood that the thermal energy storage system is intended to make thermal energy available when there is a lack of sunshine and, especially at night, in the usual way. The Rankine cycle electricity generating facility may therefore not generally function during the daytime when adequate insolation is available for the pressurized air receiver to provide required electricity.

The Rankine cycle electricity generating facility may be of any suitable type such as one comprising a heat exchanger (13), a steam turbine (14) that drives a generator (15), and a condenser (16) downstream of the steam turbine. The heat exchanger system can include any and all of an economizer, evaporator, superheater, reheater or a supercritical vapour generator depending on the working fluid. It should be noted that the Rankine cycle when operated predominantly at night time is likely to have a higher efficiency when dry cooling of the condenser can be employed. At least some residual heat contained in air leaving the Rankine cycle can be recycled, for example towards the inlet to the low-pressure receiver (9) as indicated by numeral (17) in FIG. 2.

It is noted that the air-return loop in an open air receiver plant works in such a way that the exhaust air of the steam generator is piped up the tower. The air outlet is then very close to the air receiver so that at least a part of the air is drawn into the receiver again. Even the air that is not drawn back into the receiver will benefit from the loop because the tower is also functioning as a stack with a buoyancy effect resulting in less pumping power being required. This "stack-effect" can even be used when the open air receiver is not in use to reduce the necessary outlet pressure of the gas turbine.

As provided by this invention, the exhaust gases from the gas turbine will also be made available to charge the thermal energy storage system (11) or be used immediately in the Rankine cycle electricity generating facility (12) in the event that this is required. In this regard it is noted that it may be advantageous to the life time and reliability of a plant to run the steam turbine and steam generator continuously.

When the nominal heat rating of the pressurized receiver is exceeded, in the first variation of the invention, some of the heliostats (concentrating mirrors) are controlled by a controller (18) to shift their focus from the pressurized receiver (4) to the low-pressure receiver (9). The controller thus redirects reflected solar energy from one solar power receiver to the other in a manner so as to maintain a generally predetermined solar power and energy input into the pressurized solar power receiver with solar power in excess of that being directed to the low-pressure solar power receiver for thermal storage in the normal course of events or, alternatively, for use in the Rankine cycle electricity generating facility.

Simply by way of example, the temperature of air leaving the compressor (5) could be of the order of 400° C. or in any event generally between 200 and 500° C.; the air leaving the pressurized receiver could be of the order of 1000° C. or, in any event generally between 700 and 1000° C.; the temperature of air leaving the gas turbine could be about 540° C. or in any event generally between 250 and 720° C.; and the air leaving the low-pressure receiver could be at about 540° C. or in any event generally between 250 and 1000° C.

The operation of the solar collector plant may be controlled so that the temperatures of the gases leaving the turbine and those leaving the low-pressure receiver are about the same. The pressure in the high-pressure receiver may be of the order of 15 bar but in any event, generally between 5 and 22 bar.

For heat recovery purposes the thermal energy storage system, there is a blower (19a) downstream of the heat exchanger (13) for drawing air through the packed bed and the heat exchanger with the target being to achieve an outlet air temperature from the thermal energy storage system of about 530° C., but in any event generally between 250 and 800° C.

Another blower (19b) on the cooler side of the thermal energy storage system (11) is available to suck hot air through the thermal energy storage system as conditions may dictate and out through an air outlet (31) to atmosphere with a portion of this air being available to be drawn into the unpressurized (low pressure) air receiver (9) as may be required.

Optionally, the low pressure receiver could produce higher outlet temperatures than the gas turbine at least in some operational situations. That hotter low pressure air could be mixed with the outlet air stream from the gas turbine or with ambient air or it could be fed directly into the thermal energy storage system. One advantage of this is that the storage system could be charged with hotter air wherein the energy density is higher and a smaller volume is required. Another advantage is that the Rankine cycle could be run at higher temperatures than the gas turbine outlet which would normally allow for higher efficiencies. Energy, mechanical and economical investigations are needed to demonstrate the feasibility of this concept.

In any event it is envisaged that a variety of different operational modes can be employed with the arrangement described above. In a generally common mode, the pressurized air receiver would operate under high insolation conditions and under those conditions, the unpressurised air receiver could simply feed the heated air to the thermal storage system (11); part of the heated air to the thermal storage system (11) and part to the Rankine cycle (12); or if the demand for electricity is sufficiently high, all of the output from the unpressurised air receiver could be fed to the Rankine cycle (12) for the purpose of generating electricity.

The exhaust gases from the gas turbine (7) may also be used in three different ways, namely to exclusively charge the thermal storage system with residual heat; partly to charge the thermal storage system and partly feed the Rankine cycle; or to feed the Rankine cycle exclusively. The exact combination of actions will depend on the system, prevailing circumstances and any other variables applicable to the particular solar collector plant.

Whenever the incoming air from the unpressurized receiver or thermal energy storage system is too hot for the respective purpose, ambient air can be mixed with the hot air by way of a mixing valve (20). This may be done in all operating modes. The necessity for this measure will be determined by the temperatures generated. This mixing valve may be employed to connect the input of hot air from the unpressurised receiver and the gas turbine outlet to the thermal energy storage system and/or to the Rankine cycle in different ways as may be required or to connect the thermal energy storage system to the Rankine cycle during discharge of the storage system.

Figure 4:
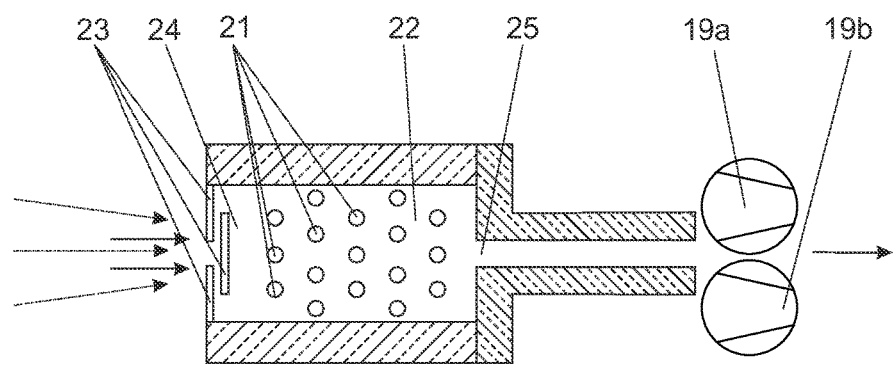
FIG. 4 is a schematic sectional side elevation showing the general construction of a combined pressurized solar power receiver and a low-pressure solar power receiver.
Figure 5:
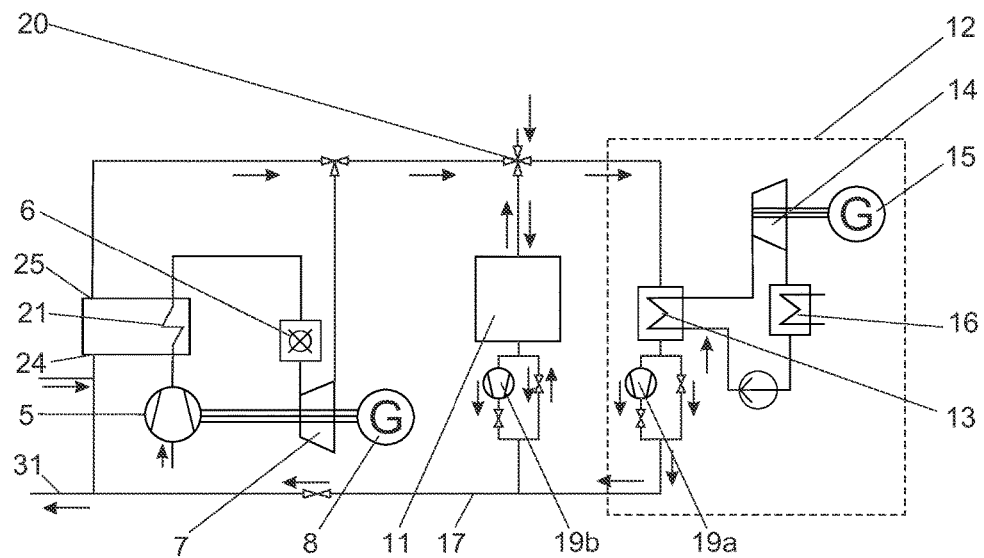
FIG. 5 is a circuit diagram of a second variation of concentrating solar power collector plant according to the invention; and, FIG. 6 is a circuit diagram of a variation to that shown in FIG. 5.

In one embodiment of the second variation of the invention that is illustrated schematically in FIGS. 4 and 5, the pressurized receiver may have any configuration of air heating enclosure that purely for the purpose of illustration is shown as an arrangement of transverse heat absorber tubes (21) located in a chamber (22) having a window (23) that, in use, is to receive solar radiation reflected by the heliostat field. The low-pressure solar power receiver may be constituted by a flow passage for air being directed at the heating enclosure of a high-pressure tubular receiver and air is passed around the enclosure so as to flow between a forward air inlet (24) and a rearward air outlet (25) and at the same time cool the enclosure at least to some extent with the air itself become heated. Suction from a variable blower that could be either or both of the blowers (19a) and (19b) may be used to move an appropriate amount of low pressure air through the flow passage according to solar power input into the receiver.

Figure 6:
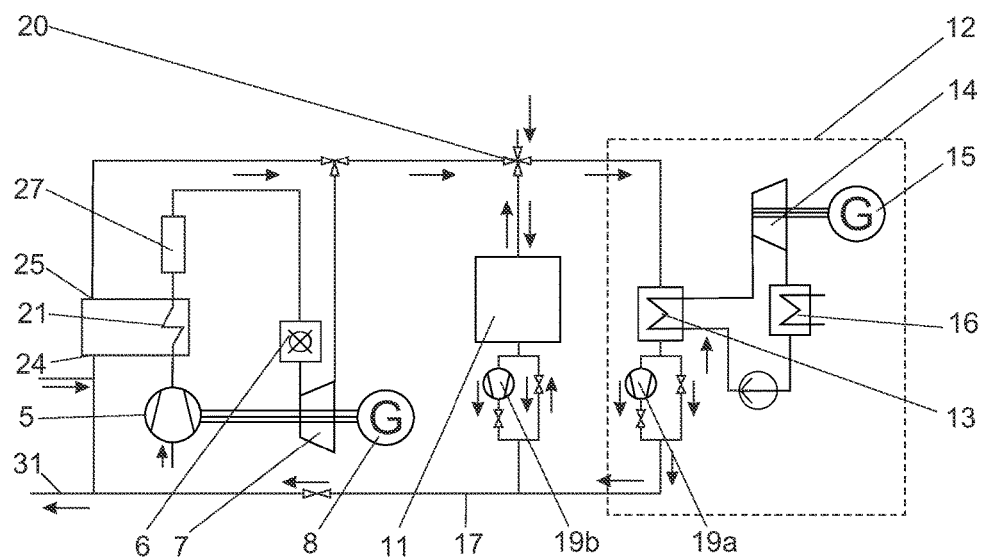

A further refinement is illustrated in FIG. 6 in which a second high-pressure (27) receiver is added to additionally heat outlet air from the first high-pressure receiver.

In each of FIGS. 5 and 6 other components of the circuit are shown with the same reference numerals as are used with reference to FIG. 2.

Applicant believes that as a general rule, combined cycle power plants offer higher overall efficiencies than single cycle plants. However, if the gas turbine is to be run at optimal load as much as possible, the concentrating heliostat field needs to be oversized and the present invention provides an advantageous way in which excess solar energy received by an oversized heliostat field at high irradiation intensities can be usefully redirected and ultimately stored for subsequent use. It is to be noted that optimal load is generally considered to be full load in at least most instances.

In morning hours, when the insolation is not strong enough to power a pressurized receiver, the low pressure receiver can heat up air which can be used to preheat pipes and machinery. It is to be noted that pressurized receivers require an optimized heliostat field, which means that the land usage is not very high. Secondary low pressure receivers can offer an alternative target for receivers that cannot efficiently focus on the high pressure receivers due to the angle of the sun's position.

The heat transfer fluid in the gas turbine and low pressure receiver can be air or any other gas. The cycle incorporating the receivers can be closed or open.

The pressurized receiver system can consist of several receivers in series (for example, low, intermediate and high temperature). Of these, one or several can be coupled with a low pressure receiver system. The bottoming cycle may be completely decoupled from the rest of the plant and can therefore incorporate any thermodynamic cycle and working fluid, including saturated, superheated or supercritical steam, supercritical $CO_2$ or a fluid in an Organic Rankine Cycle or a fluid in a bottoming Brayton cycle.

Numerous variations may be made to the embodiments of the invention described above without departing from the scope hereof.

The invention claimed is:

1. A concentrating solar power collector plant comprising a heliostat field for directing reflected solar radiation towards a pressurized solar power receiver having an associated gas turbine and to a low-pressure solar power receiver having an associated unpressurized thermal energy storage system in the form of a stationary packed bed of suitable heat resistant thermal storage units charged by heated air, wherein exhaust from the gas turbine is connected to the thermal energy storage system to deliver residual heat to the thermal energy storage system in addition to heat received from the low-pressure solar power receiver; wherein at least some heliostats of the heliostat field are connected to a controller programmed to direct excess reflected solar energy at high irradiation intensities away from the pressurized solar power receiver and towards the low-pressure solar power receiver at times when said reflected solar energy is not required to maintain the gas turbine at load.

2. A concentrating solar power collector plant as claimed in claim 1 in which solar power in excess of that required to maintain the gas turbine at close to optimal load is directed to the low-pressure solar power receiver for thermal storage or, alternatively, for immediate use in a Rankine cycle electricity generating facility.

3. A concentrating solar power collector plant as claimed in claim 1 in which an outlet from the pressurized solar power receiver is fed through a further solar power receiver in order to further heat compressed gas emanating from the pressurized solar power receiver.

4. A concentrating solar power collector plant as claimed in claim 1 in which the gas turbine is coupled to an electrical generator and a compressor for supplying pressurized gas to the pressurized solar power receiver.

5. A concentrating solar power collector plant as claimed in claim 1 in which the pressurized gas is air.

6. A concentrating solar power collector plant as claimed in claim 1 in which a combustion chamber is interposed between the outlet from the pressurized solar power receiver and the inlet to the gas turbine.

7. A concentrating solar power collector plant as claimed in claim 1 in which the pressurized solar power receiver is of the tubular type.

8. A concentrating solar power collector plant as claimed in claim 1 in which the thermal energy storage system forms part of a Rankine cycle electricity generating installation.

9. A concentrating solar power collector plant as claimed in claim 8 in which residual heat in air leaving the Rankine cycle is recovered by recycling the air to a suitable inlet to the low-pressure receiver.

10. A concentrating solar power collector plant as claimed in claim 8 in which an ambient air mixing valve is provided to connect the input of hot air from the low-pressure receiver and from the exhaust of the gas turbine to at least one of the thermal energy storage system and the Rankine cycle.

11. A concentrating solar power collector plant as claimed in claim 10 in which the ambient air mixing valve connects the thermal energy storage system to the Rankine cycle during discharge of the storage system.

* * * * *